United States Patent

Ono et al.

[11] Patent Number: 6,149,310
[45] Date of Patent: Nov. 21, 2000

[54] HALF THRUST BEARING

[75] Inventors: Akira Ono; Koichi Yamamoto; Takayuki Shibayama, all of Nagoya, Japan

[73] Assignee: Daido Metal Company Ltd., Nagoya, Japan

[21] Appl. No.: 09/187,031

[22] Filed: Nov. 6, 1998

[30] Foreign Application Priority Data

Jan. 12, 1998 [JP] Japan .................................. 10-004109

[51] Int. Cl.⁷ .................................................... F16C 17/04
[52] U.S. Cl. ........................................... 384/420; 384/294
[58] Field of Search ..................................... 384/294, 275, 384/288, 420, 912

[56] References Cited

U.S. PATENT DOCUMENTS

Re. 32,764  10/1988  Smith et al. .............................. 384/275
4,714,356  12/1987  Damour et al. .......................... 384/294

Primary Examiner—Lenard A. Footland
Attorney, Agent, or Firm—Browdy and Neimark

[57] ABSTRACT

There is disclosed a half thrust bearing of a substantially semi-circular shape. A thrust relieve 22, slanting toward a confronting end of the half thrust bearing progressively away from a bearing surface of a half thrust bearing, is formed at each of circumferentially-spaced opposite end portions of the bearing surface by pressing (cold forging), so that those portions of the bearing surface, disposed adjacent respectively to the thrust relieves 22, are higher in strength than the other portions of the bearing surface. With this construction, even if a thrust collar of a crankshaft abuts against localized portions of the bearing surface disposed adjacent to the thrust relieves 22, a bearing alloy will not subjected to premature fatigue and separation.

8 Claims, 6 Drawing Sheets

19a AND 20b
CONFRONTING ENDS

HALF THRUST BEARING

BACKGROUND OF THE INVENTION

This invention relates to a half thrust bearing.

A thrust bearing for bearing a thrust load, for example, of a crankshaft of an engine, comprises two half thrust bearings, and one of the two half thrust bearings is mounted on a cylinder block while the other half thrust bearing is mounted on a bearing cap.

In this half thrust bearing, a step G (see FIG. 10) is sometimes formed between bearing surfaces of the two half thrust bearings 1 and 2 because of the processing accuracy of the half thrust bearings, the assembling accuracy for the cylinder block and the bearing cap, and the thermal expansion difference between the cylinder block and the bearing cap. In this case, a thrust collar of the crankshaft is abutted hard against confronting ends (that is, localized portions) of the half thrust bearings 1 and 2, and as a result a bearing alloy is subjected to premature fatigue, or is separated. In order to prevent this, a thrust relief 4 is formed at each of circumferentially-spaced opposite (both) end portions of the bearing surface of each of the conventional half thrust bearings 1 and 2, the thrust relief 4 being slanting toward the confronting end of the half thrust bearing progressively away from the bearing surface. Alternatively, the confronting ends of the bearing surface are chamfered. With these methods, the local contact has been alleviated.

In order to prevent seizure and premature fatigue due to the local abutment, it is preferred that the thrust reliefs 4 and the chamfered portions are increased in size. However, this reduces the pressure-receiving area (bearing surface area), so that the thrust load carrying capacity is lowered. In order to compensate for the reduction of the pressure-receiving area, it is necessary to decrease the inner diameter of the half thrust bearing or to increase the outer diameter thereof.

However, if the inner diameter of the half thrust bearing is decreased, the diameter of the crankshaft must be decreased, and the radius of a fillet between a journal portion and a thrust collar portion must be decreased, and this may affect the strength of the crankshaft. If the outer diameter of the half thrust bearing is increased, the thrust collar of the crankshaft must be increased, too, and therefore the overall weight of the engine increases, and besides the friction between each half thrust bearing and the thrust collar increases, so that the efficiency of the engine is lowered.

Thus, to increase the size of the thrust reliefs 4 and the chamfered portions, and to compensate for the reduction of the pressure-receiving area, resulting therefrom, invite the various problems, and therefore are not practical.

Although one half thrust bearing 2 is retained on the cylinder block 5 or the bearing cap 6 against rotation, the other half thrust bearing 1 is not retained against rotation, and therefore moves in the circumferential direction in accordance with the rotation of the crankshaft. At this time, if a step is formed between the cylinder block 5 and the bearing cap 6 as shown in FIG. 10, the confronting ends of the half bearing 1 strike against this step portion, and are plastically deformed, and an end play of the half thrust bearing 1 is increased because of the presence of a recess 7 resulting from this plastic deformation, which leads to a possibility that abnormal noises are produced or to a possibility that the deformation further proceeds, and develops into a crack.

SUMMARY OF THE INVENTION

With the above problems in view, it is a first object of this invention to provide a half thrust bearing in which premature fatigue of localized portions of a bearing surface is prevented as much as possible without increasing thrust relieves.

A second object of the invention is to provide a half thrust bearing in which seizure and premature fatigue of localized portions of a bearing surface are prevented as much as possible without increasing chamfered portions.

A third object of the invention is to provide a half thrust bearing in which the plastic deformation of confronting ends of the half thrust bearing is prevented as much as possible.

The first object has been achieved by a half thrust bearing of the present invention wherein a thrust relief, slanting toward a confronting end of the half thrust bearing progressively away from a bearing surface of the half thrust bearing, is formed at each of circumferentially-spaced opposite end portions of the bearing surface, so that those portions of the bearing surface, disposed adjacent respectively to the thrust relieves, are higher in strength than the other portions of the bearing surface.

The second object has been achieved by a half thrust bearing of the invention wherein a corner portion of each of opposite ends of the half thrust bearing at a bearing surface thereof is chamfered, so that those portions of the bearing surface, disposed adjacent respectively to the chamfered portions, are higher in strength than the other portions of the bearing surface.

In the above constructions, the localized portions of the bearing surface (such as those portions of the bearing surface, disposed adjacent respectively to the thrust relieves, or those portions of the bearing surface, disposed adjacent respectively to the chamfered portions), which are liable to local abutment, are higher in strength than the other portions of the bearing surface, and therefore the premature fatigue can be prevented as much as possible and the long life can be obtained without adversely affecting the intended function of the bearing.

The third object has been achieved by a half thrust bearing of the invention wherein end surfaces of confronting ends of the half thrust bearing are higher in strength than the other portions of the half thrust bearing.

In this construction, even if a step is formed between members respectively holding the pair of half trust bearings, the plastic deformation of the confronting ends is prevented as much as possible.

Also, the first, second and third objects can be achieved by a half thrust bearing of the invention having at least two of the following features (a) to (c);

(a) wherein a thrust relief, slanting toward a confronting end of the half thrust bearing progressively away from a bearing surface of the half thrust bearing, is formed at each of circumferentially-spaced opposite end portions of the bearing surface, so that those portions of the bearing surface, disposed adjacent respectively to the thrust relieves, are higher in strength than the other portions of the bearing surface;

(b) wherein a corner portion of each of the opposite ends of the half thrust bearing at the bearing surface thereof is chamfered, so that those portions of the bearing surface, disposed adjacent respectively to the chamfered portions, are higher in strength than the other portions of the bearing surface; and (c) wherein end surfaces of the confronting ends of the half thrust bearing are higher in strength than the other portions of the half thrust bearing.

In the present invention, the bearing surface can be formed by a bearing alloy which is made of one of a copper base alloy, a tin base alloy, a lead base alloy and an aluminum base alloy.

In order to secure the good initial conformability, an overlay layer can be formed on that portion of the bearing surface, including the higher-strength portions, or on the bearing surface over an entire area thereof.

DESCRIPTION OF THE PREFERRED EMBODIMENTS

A first embodiment of the present invention will now be described with reference to FIGS. 1 to 4.

Figure 4:
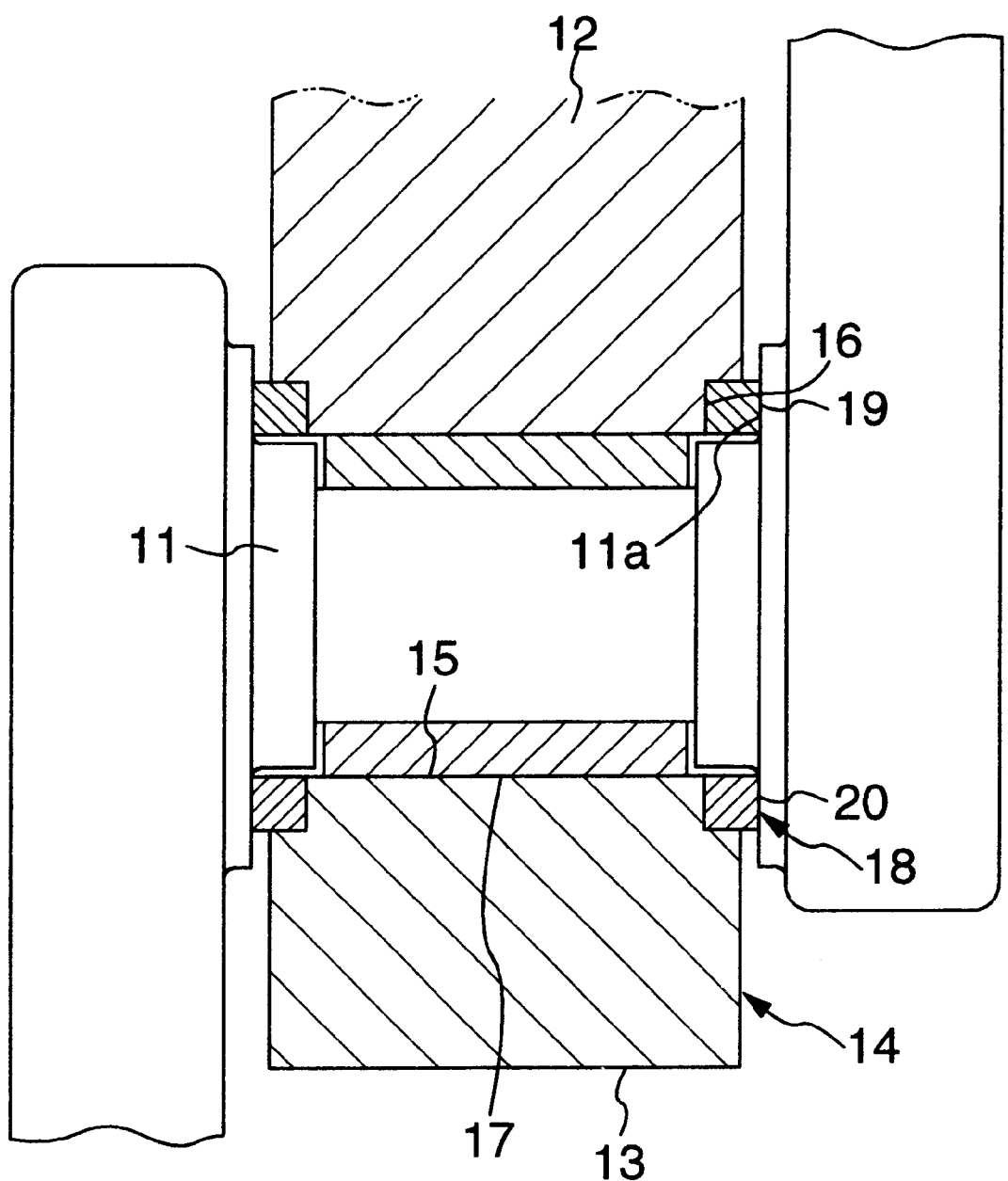
FIG. 4 is a cross-sectional view of a bearing housing of the crankshaft.

FIG. 4 shows a bearing arrangement of a crankshaft 11. In this Figure, a bearing cap 13 is mounted on a lower portion of a cylinder block 12 to form a bearing housing 14. A bearing bore 15 is formed in the bearing housing 14, and seats 16 each in the form of a circular or annular recess are formed respectively in opposite end surfaces of the bearing housing 14. A main bearing 17, bearing the crankshaft 11, is fitted in the bearing bore 15, and a thrust bearing 18, bearing a thrust collar 11a of the crankshaft 11, is assembled in each of the seats 16.

Figure 3:
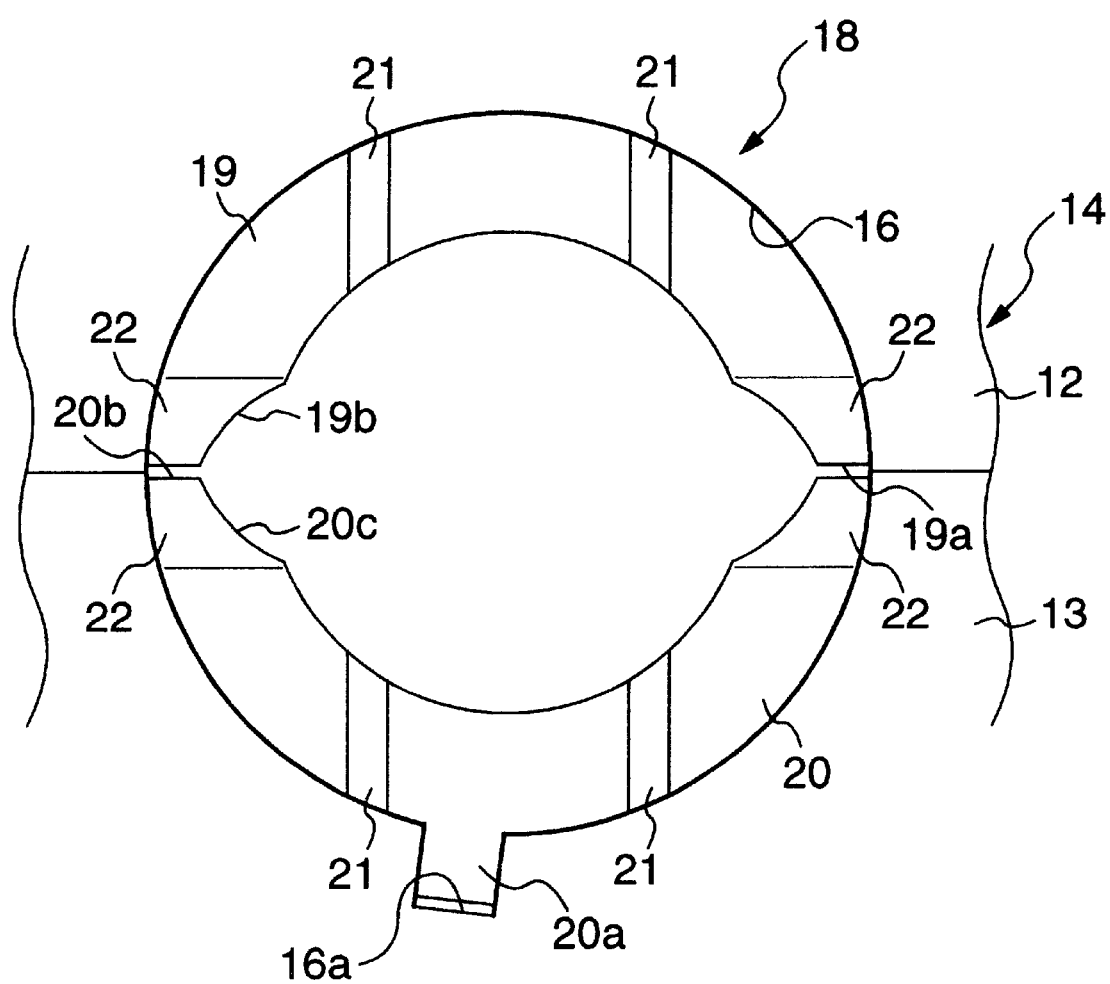
FIG. 3 is a front-elevational view of a thrust bearing of a crankshaft.

As shown in FIG. 3, the thrust bearing 18 comprises two half thrust bearings 19 and 20 of a substantially semi-circular shape. A projection 20a is formed, for example, on the lower half thrust bearing 20, and this projection 20a is fitted in an engagement groove 16a, formed in a peripheral surface of the seat 16, to thereby hold the whole of the thrust bearing 18 against rotation. In this case, each of the upper and lower half thrust bearings 19 and 20 is assembled in the seat 16, with a small clearance formed therebetween, and the upper half thrust bearing 19 can slightly move in the circumferential direction.

Oil grooves 21 are formed respectively in predetermined portions of a bearing thrust surface (held in sliding contact with the thrust collar 11a) of each of the two half thrust bearings 19 and 20, and a thrust relief 22 is formed at each of opposite (both) end portions of the bearing surface of each of the half thrust bearings 19 and 20, the thrust relief 22 being slanting toward a confronting end 19a, 20b of the half thrust bearing progressively away from the bearing surface.

Each of the half thrust bearings 19 and 20 is formed by stamping a semi-circular piece by a punch press from a bimetal sheet comprising a backing metal 23 lined with a bearing alloy 24. The backing metal 23 is made, for example, of a steel sheet, and the bearing alloy 24 is made of copper base alloy, tin base alloy, lead base alloy, aluminum base alloy, or the like. In this stamping operation, the stamping is carried out in such a manner that the opposite end portions of the half thrust bearings 19 and 20 slightly overlap in order to enhance the yield of the bimetal. As a result, arcuate notches 19b, 20c are formed respectively in the inner peripheral surfaces of the opposite end portions of each of the half thrust bearings 19 and 20.

Figure 2:
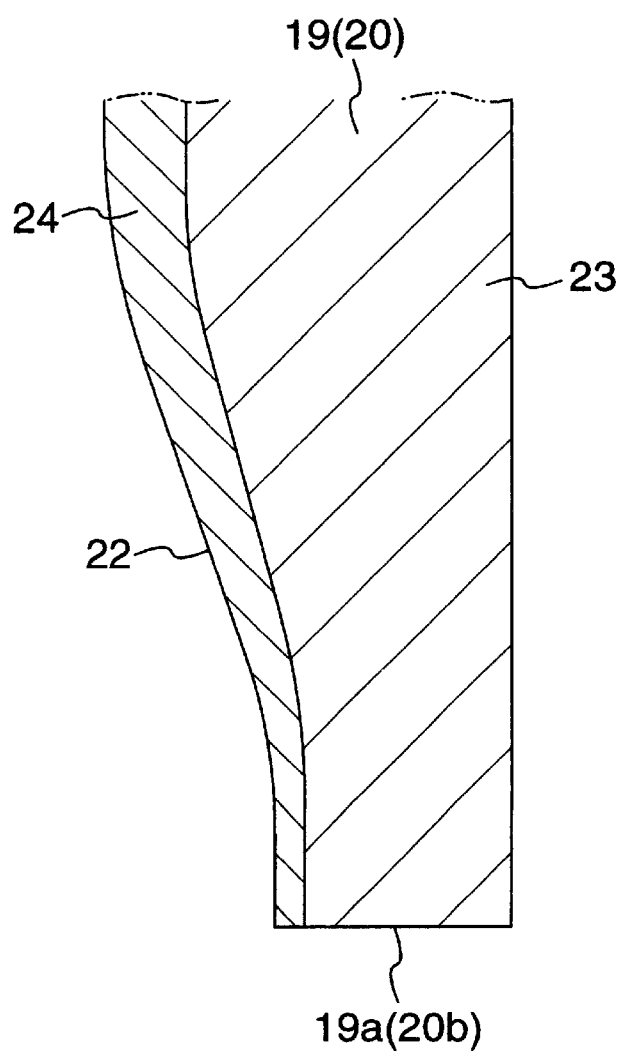
FIG. 2 is an enlarged, cross-sectional view of a portion of the half thrust bearing, showing a thrust relief.

After the half thrust bearings 19 and 20 are stamped from the sheet, the circumferentially-spaced opposite end portions of each of the half thrust bearings 19 and 20 are pressed at the bearing surface by a kind of cold forging, so that the slanting thrust relieves 22 are formed respectively at the opposite end portions of the bearing surface. At this time, the thrust relief 22 is formed such that that portion of the thrust relief 22, disposed adjacent to the confronting end 19a, 20b, is arcuately concave while that portion of the thrust relief 22, disposed adjacent to the substantial bearing surface (that is, disposed remote from the confronting end 19a, 20b), is arcuately convex, as shown in FIG. 2.

The thrust relieves 22 are thus formed respectively at the circumferentially-spaced opposite end portions of each of the half thrust bearings 19 and 20 by cold forging, and as a result those portions of the bearing surface (in contact with the thrust collar 11a) of each half thrust bearing, disposed adjacent respectively to the thrust relieves 22, have a higher strength.

Figure 1:
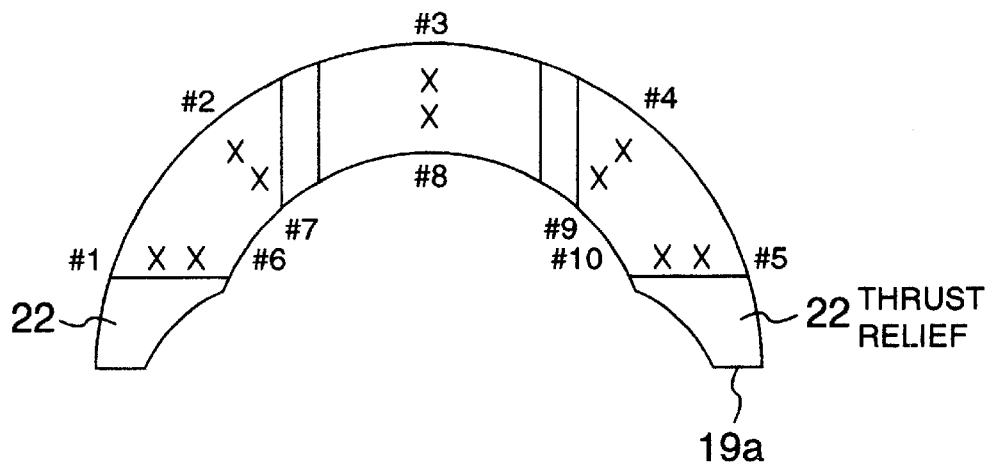
FIG. 1 is a front-elevational view of a first embodiment of a half thrust bearing of the present invention, showing hardness-measuring portions.

Half thrust bearings 19 and 20 were stamped from a bimetal sheet having a bearing alloy 24 consisting of Al-12Tin-3Si base alloy (Sample 1), and also half thrust bearings 19 and 20 were stamped from a bimetal sheet having a bearing alloy 24 consisting of Cu-10Sn-10Pb (Sample 2), and thrust relieves 22 were formed at these half thrust bearings in the manner described above, and the hardness of ten portions #1 to #10 (indicated by x in FIG. 1) of each half thrust bearing were measured. Results of this measurement are shown in Tables 1 and 2. In FIG. 1, only one half thrust bearing 19 is shown.

TABLE 1

| Sample 1 (Al—12Sn—3Si base bearing alloy) | | | | | | | | | | |
|---|---|---|---|---|---|---|---|---|---|---|
| Portion | #1 | #2 | #3 | #4 | #5 | #6 | #7 | #8 | #9 | #10 |
| Hardness Hv5 | 48 | 42 | 42 | 42 | 47 | 49 | 42 | 42 | 42 | 48 |

TABLE 2

| Sample 2 (Cu—10Sn—10Pb base bearing alloy) | | | | | | | | | | |
|---|---|---|---|---|---|---|---|---|---|---|
| Portion | #1 | #2 | #3 | #4 | #5 | #6 | #7 | #8 | #9 | #10 |
| Hardness Hv5 | 90 | 82 | 82 | 82 | 90 | 91 | 82 | 82 | 82 | 91 |

It will be appreciated from Tables 1 and 2 that as a result of forming the thrust relieves 22 by pressing, the hardness of those portions (#1, #5, #6 and #10) of the bearing surface, disposed adjacent to the thrust relieves 22, is higher than that of the other portions. Usually, the hardness is correlated with the strength, and the higher the hardness, the higher the strength.

Incidentally, the surface portion of the thrust relief 22 is increased in strength (hardness) by the pressing.

In the present invention, the half thrust bearings 19 and 20, in which those portions of the bearing surface, disposed adjacent to the thrust relieves 22, have the high strength, are used, and in this case, even if a step is formed between the bearing surfaces of the half thrust bearings 19 and 20 because of the processing accuracy of the half thrust bearings 19 and 20 and the thermal expansion difference between the cylinder block 12 and the bearing cap 13, so that the thrust collar 11a abuts against those portions (that is, localized portions) of the half thrust bearings 19 and 20 disposed adjacent to the thrust relieves 22, the bearing alloy will not be subjected to premature fatigue and separation since these portions have the high strength.

The inventor of the present invention has conducted an endurance test, using products (Sample 1 and Sample 2) of the present invention and conventional products in which thrust relieves were formed by machining or cutting, and any of the products of the present invention had no problem.

More specifically, using a diesel engine with a displacement of 1.7 liters, the endurance test of Sample 1 was conducted for 200 hours at a rated engine speed under a full load. Using a diesel engine with a displacement of 5 liters, the endurance test of Sample 2 was conducted for 800 hours at a rated engine speed under a full load. As a result, in all of the conventional products, the bearing alloy was subjected to fatigue and separation at those portions adjacent to the thrust relieves. However, in the products of the present invention, such phenomenon never occurred, and there was no problem at all.

Thus, in this embodiment, even if the thrust relieves 22 are not particularly increased in size in order to alleviate the local abutment, the fatigue and separation of the bearing alloy will not occur. Therefore, the reduction of the pressure-receiving area (bearing surface area) of the half thrust bearings 19 and 20, which is necessitated by the increase of the thrust relieves 22, is not necessary. Thus, the pressure-receiving area does not need to be increased in size by decreasing the inner diameter of the half thrust bearings 19 and 20 (and hence by decreasing the diameter of the crankshaft 11), or by increasing the outer diameter of the half thrust bearings (and hence by increasing the diameter of the thrust collar 11a).

And besides, the bearing surface of the half thrust bearings is not increased in strength over the entire surface thereof, but those portions (that is, localized portions) of the bearing surface, disposed adjacent to the thrust relieves, are increased in strength so as to prevent the premature fatigue of these localized portions, and therefore the function of the bearing, such as conformability and embeddability, will not be lowered.

Figure 5:
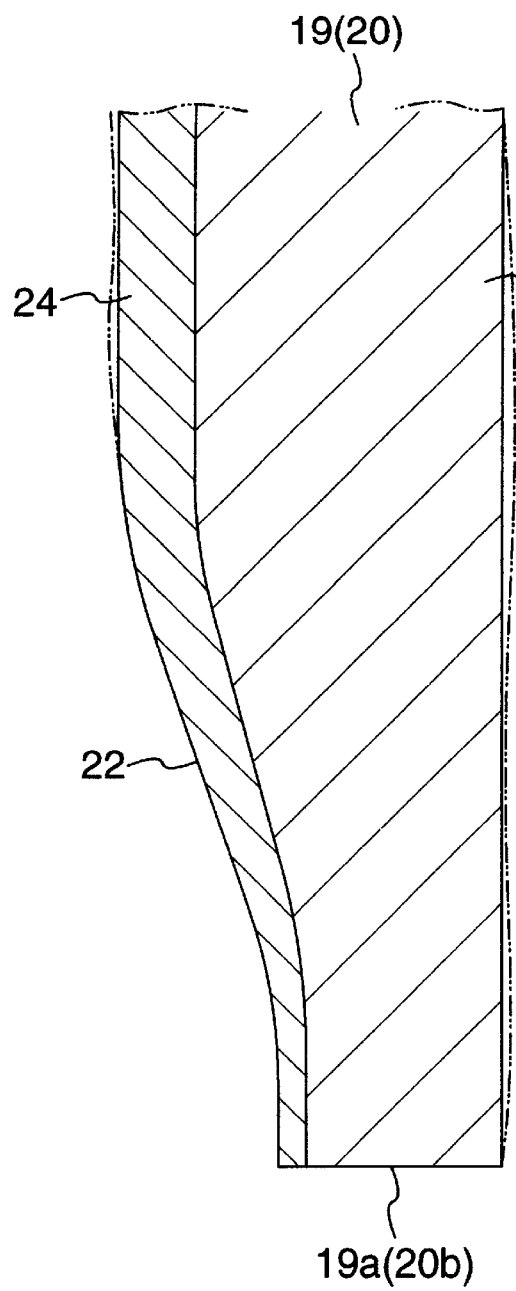
FIG. 5 is a view similar to FIG. 2, but showing a second embodiment of the invention.

FIG. 5 shows a second embodiment of the present invention. When the thrust relief 22 is formed by pressing, the half thrust bearing is sometimes slightly deformed to assume a wavy contour as a whole as indicated in two dots-and-dash lines in FIG. 5. Therefore, the opposite sides (faces) of each of the half thrust bearings 19 and 20 are ground so as to enhance the flatness.

Figure 6:
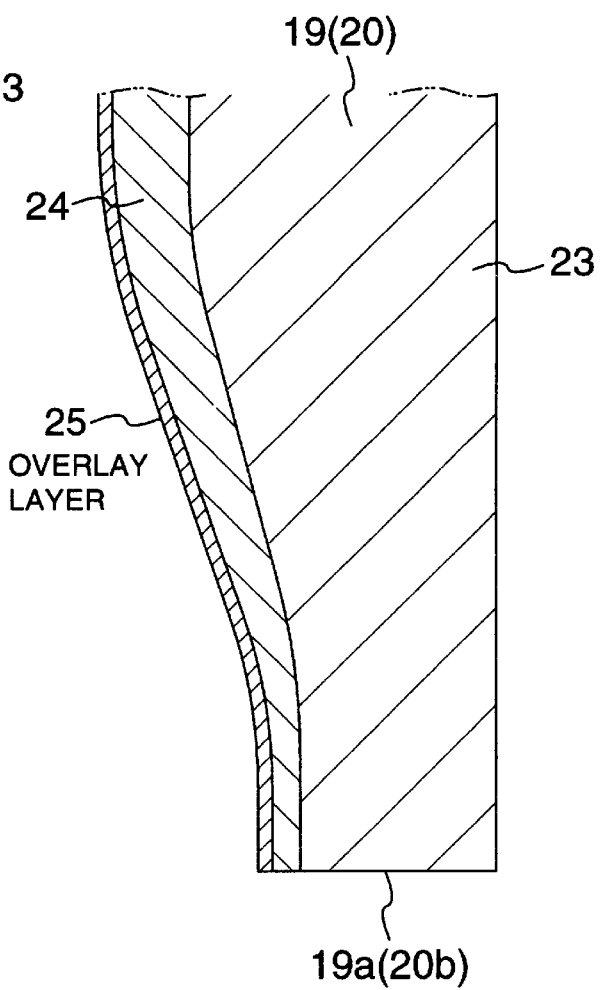
FIG. 6 is a view similar to FIG. 2, but showing a third embodiment of the invention.

FIG. 6 shows a third embodiment. In this embodiment, in order to enhance the conformability of the bearing surface, an overlay layer 25, having a thickness of 2 to 30 μm, is formed on the surface of the bearing alloy 24 of each of the half thrust bearings 19 and 20 serving as the bearing surface. In this case, the overlay layer 25 comprises a plating layer, composed of Pb, Pb alloy, Sn or Sn alloy, or a resin-coating layer.

In this embodiment, the thrust relieves 22 are formed by pressing on each of the half thrust bearings 19 and 20 so as to increase the strength thereof, and in the case where the opposite sides of the half thrust bearing are ground so as to eliminate the wavy contour as described above for the third embodiment, the overlay layer 25 is formed on the bearing alloy 24 after this grounding operation is effected.

Figure 7:
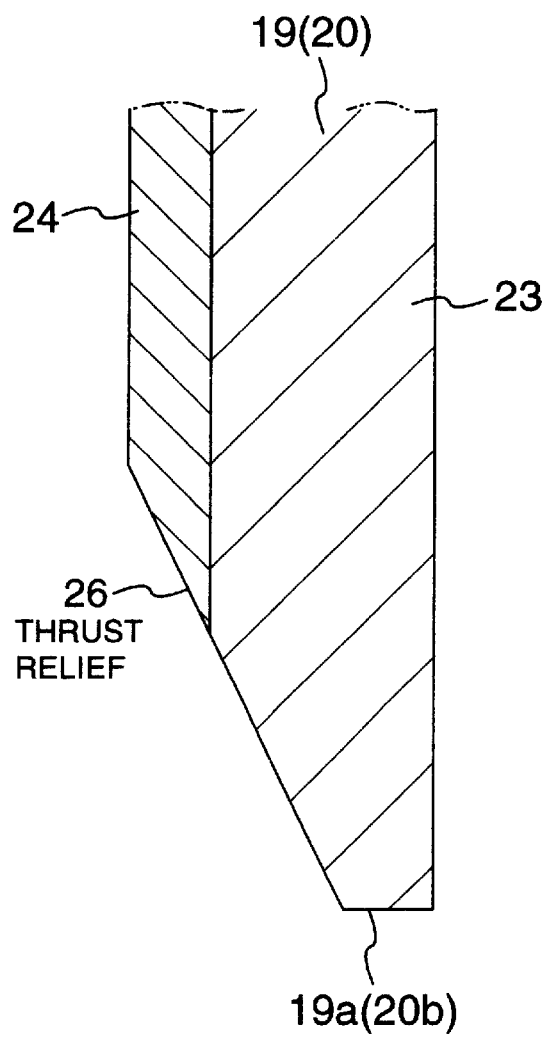
FIG. 7 is a view similar to FIG. 2, but showing a fourth embodiment of the invention.

FIG. 7 shows a fourth embodiment of the present invention. This embodiment differs from the first embodiment in that each thrust relief 26 is formed by cutting, and then those portions (that is, localized portions) of the bearing surface, disposed adjacent to the thrust relieves 26, are heat treated to be increased in strength (hardness).

In this embodiment, the heat treatment of the localized portions of the bearing surface, disposed adjacent to the thrust relieves 26, is effected, for example, by heating the localized portions by a laser beam, and then by cooling these portions.

Figure 8:
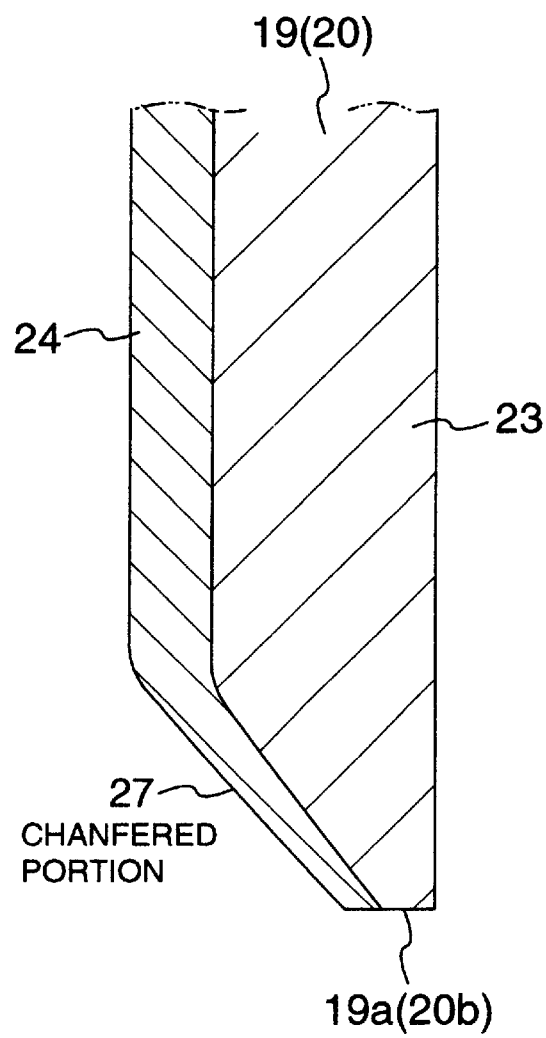
FIG. 8 is a cross-sectional view of a portion of a fifth embodiment of the invention, showing a chamfered portion.

FIG. 8 shows a fifth embodiment of the present invention. This embodiment differs from the first embodiment in that a corner portion (edge portion) of each of opposite ends of each half thrust bearing 19, 20 at a bearing surface thereof is chamfered. In this case, each chamfered portion 27 is formed by pressing (a kind of cold forging) as in the first embodiment, and as a result those portions of the bearing surface, disposed adjacent to the chamfered portions 27, are higher in strength than the other portions, and similar effects as achieved with the first embodiment can be obtained.

Figure 9:
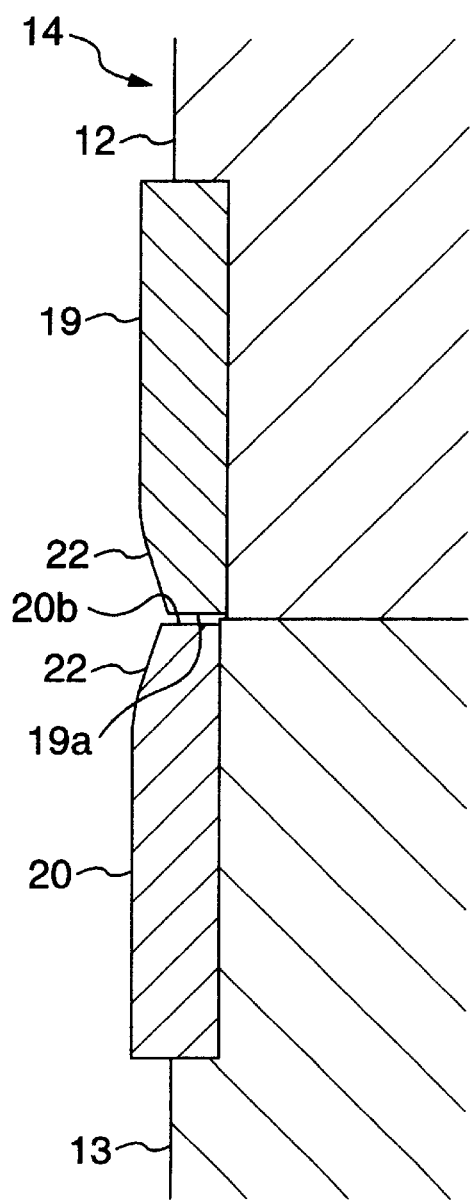
FIG. 9 is a cross-sectional view of a sixth embodiment of a thrust bearing of the invention in a circumferential direction.
Figure 10:
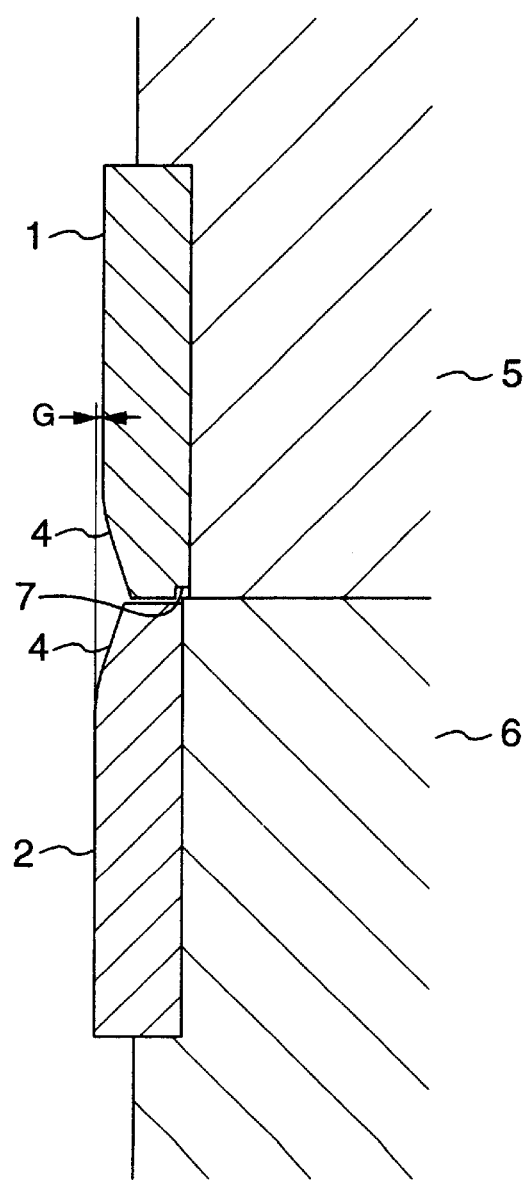
FIG. 10 is similar to FIG. 9, but showing a conventional construction.

FIG. 9 shows a sixth embodiment of the present invention. In this embodiment, end surfaces of confronting ends 19a and 20b of half thrust bearings 19 and 20 are higher in strength than the other portions. The strength of the confronting ends 19a and 20b can be increased, for example, by a hardening method in which the confronting ends 19a and 20b are heated by a laser beam, and then are quenched, or by a method in which the confronting ends 19a and 20b are compressed by a press.

Thus, the confronting ends 19a and 20b of the half thrust bearings 19 and 20 have the increased strength, and therefore even if the confronting ends 19a and 20b abut against a step between the cylinder block 13 and the bearing cap 14 when the half thrust bearings 19 and 20 move in the circumferential direction in the seat 16 in accordance with the rotation of the crankshaft 11, the confronting ends 19a and 20b will not be plastically deformed and cracked.

The present invention is not limited to the above embodiments shown in the drawings, but the following changes and modifications can be made.

The strength of the projection 20a of the half thrust bearing 20 may be increased, and in this case the plastic deformation and cracking of the projection 20a can be prevented.

A small hole for fitting on a detent pin (rotation prevention pin) may be formed in the half thrust bearing 19, and that portion of the half thrust bearing 19 around this small hole may be increased in strength.

Each of the half thrust bearings 19 and 20 does not need to be made of the bimetal, but may be made entirely of a bearing alloy.

There may be used an arrangement in which the thrust relief 22 is formed at one of the circumferentially-spaced opposite end portions of each of the half thrust bearing 19 and 20, thereby increasing the strength of that portion near to this thrust relief 22, while the chamfered portion 27 is formed at the other end portion, thereby increasing the strength of that portion near to this chamfered portion 27.

The formation of the thrust relieves 22 or the chamfered portions 27 so as to increase the strength of their neighboring portions, and the increase of the strength of the confronting ends 19a, 20b may be effected simultaneously for the single half thrust bearing 19, 20.

What is claimed is:

1. A half thrust bearing of a substantially semi-circular shape;

wherein a thrust relief, slanting toward a confronting end of said half thrust bearing progressively away from a bearing surface of said half thrust bearing, is formed at each of circumferentially-spaced opposite end portions of said bearing surface, so that those portions of said bearing surface, disposed adjacent respectively to said thrust relieves, are higher in strength than the other portions of said bearing surface.

2. A half thrust bearing according to claim 1, in which said bearing surface is formed by a bearing alloy, and said bearing alloy is made of one of a copper base alloy, a tin base alloy, a lead base alloy and an aluminum base alloy.

3. A half thrust bearing according to claim 2, in which an overlay layer is formed on that portion of said bearing surface, including said higher-strength portions, or on said bearing surface over an entire area thereof.

4. A half thrust bearing according to claim 1, in which an overlay layer is formed on that portion of said bearing surface, including said higher-strength portions, or on said bearing surface over an entire area thereof.

5. A half thrust bearing of a substantially semi-circular shape having at least two of the following features (a) to (c);

(a) wherein a thrust relief, slanting toward a confronting end of said half thrust bearing progressively away from a bearing surface of said half thrust bearing, is formed at each of circumferentially-spaced opposite end portions of said bearing surface, so that those portions of said bearing surface, disposed adjacent respectively to said thrust relieves, are higher in strength than the other portions of said bearing surface;

(b) wherein a corner portion of each of the opposite ends of said half thrust bearing at said bearing surface thereof is chamfered, so that those portions of said bearing surface, disposed adjacent respectively to said chamfered portions, are higher in strength than the other portions of said bearing surface; and (c) wherein end surfaces of the confronting ends of said half thrust bearing are higher in strength than the other portions of said half thrust bearing.

6. A half thrust bearing according to claim 5, in which an overlay layer is formed on that portion of said bearing surface, including said higher-strength portions, or on said bearing surface over an entire area thereof.

7. A half thrust bearing according to claim 5, in which said bearing surface is formed by a bearing alloy, and said bearing alloy is made of one of a copper base alloy, a tin base alloy, a lead base alloy and an aluminum base alloy.

8. A half thrust bearing according to claim 7, in which an overlay layer is formed on that portion of said bearing surface, including said higher-strength portions, or on said bearing surface over an entire area thereof.

* * * * *